United States Patent
Weber et al.

(10) Patent No.: US 6,211,266 B1
(45) Date of Patent: Apr. 3, 2001

(54) DIMENSIONALLY STABLE THERMOPLASTIC MOULDING MATERIALS

(75) Inventors: Martin Weber, Maikammer (DE); Peter Wolf, Grosse Ile, MI (US); Stefan Grutke, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,195

(22) PCT Filed: Nov. 4, 1998

(86) PCT No.: PCT/EP98/07025

§ 371 Date: May 11, 2000

§ 102(e) Date: May 11, 2000

(87) PCT Pub. No.: WO99/25771

PCT Pub. Date: May 27, 1999

(30) Foreign Application Priority Data

Nov. 15, 1997 (DE) ............................................. 197 50 725

(51) Int. Cl.$^7$ .............................. C08K 9/06; C08K 77/00
(52) U.S. Cl. ............................ 523/212; 524/514; 525/183
(58) Field of Search ........................... 525/183; 523/212; 524/514

(56) References Cited

U.S. PATENT DOCUMENTS 4,500,668  2/1985  Shimizu et al. .................... 524/427

FOREIGN PATENT DOCUMENTS

| 25 44 252 | 4/1977 | (DE) . |
|---|---|---|
| 33 34 561 | 3/1984 | (DE) . |
| 028 391 | 5/1981 | (EP) . |
| 312 930 | 4/1989 | (EP) . |
| 583 706 | 2/1994 | (EP) . |

OTHER PUBLICATIONS

XP–002103124—Derwent—JP690071647.
Abst. JO 3009–952.

*Primary Examiner*—Ana Woodward
(74) *Attorney, Agent, or Firm*—Keil & Weinkauf

(57) ABSTRACT

Thermoplastic molding compositions comprise
  A) from 10 to 97.9% by weight of a partly crystalline polyamide,
  B) from 0.1 to 50% by weight of a copolyamide composed of
    $B_1$) from 60 to 90 mol % of units derived from s-caprolactam and
    $B_2$) from 10 to 40 mol % of units derived from aliphatic dicarboxylic acids and from aliphatic diamines,
  C) from 1 to 40% by weight of a copolymer based on styrene or on substituted styrenes and on unsaturated nitriles,
  D) from 1 to 50% by weight of a fibrous filler and
  E) from 0 to 30% by weight of other additives, where the percentages by weight of components A) to E) are 100% in total.

8 Claims, No Drawings

DIMENSIONALLY STABLE THERMOPLASTIC MOULDING MATERIALS

The invention relates to thermoplastic molding compositions comprising

- A) from 10 to 97.9% by weight of a partly crystalline polyamide,
- B) from 0.1 to 50% by weight of a copolyamide composed of
  - $B_1$) from 60 to 90 mol % of units derived from ε-caprolactam and
  - $B_2$) from 1 to 50 mol % of units derived from aliphatic dicarboxylic acids and from aliphatic diamines,
- C) from 1 to 40% by weight of a copolymer based on styrene or on substituted styrenes and on unsaturated nitriles,
- D) from 1 to 50% by weight of a fibrous filler and
- E) from 0 to 30% by weight of other additives, where the percentages by weight of components A) to E) are 100% in total.

In addition, the invention relates to the use of the novel molding compositions for producing fibers, films and moldings, and also to the moldings obtainable in this way, in particular welded moldings or those obtainable by two-component injection molding.

Because of their good mechanical properties, glass-fiber-reinforced polyamides have very wide application, in particular for highly stressed parts in the automotive and electrical industries, and also in mechanical and chemical engineering. A disadvantage of glass-fiber-reinforced polyamides is their high tendency to deform. This presents problems especially when complicated components are being produced which may possibly have to be combined with other components in subsequent steps by welding, screwing or two-component injection molding.

The tendency to deform is also a disadvantage in producing sheet-like or round components, and also components where there are high requirements in relation to dimensional tolerances.

Mixtures of polyamides, styrene copolymers and glass fibers are disclosed in JP-B 55/045 576. U.S. Pat. No. 3,243,478 discloses molding compositions composed of polyamide, styrene copolymers and fillers, and these have good mechanical properties and reduced moisture absorption. DE-A 25 44 252 discloses colored thermoplastic molding compositions which, besides polyamide and glass fibers, may also contain styrene copolymers. The subject matter of DE-A 33 34 561 is reinforced thermoplastic molding compositions which, besides a polyamide based on xylylenediamine (i.e. an amorphous polyamide) comprise other polyamides, and also a styrene copolymer. Molding compositions of this type are particularly good for coating purposes.

The molding compositions known hitherto, however, still have disadvantages with respect to deformation and shrinkage. In addition, the surface of the products is not adequate for the high requirements placed on parts used in applications where they are visible. Dimensionally stable thermoplastic molding compositions are also the subject matter of JP-A 03/009 952, where dimensional stability is improved by using an amorphous polyamide.

It is an object of the present invention to provide fiber-reinforced thermoplastic polyamide molding compositions which have lower shrinkage and deformation, and also an improved surface and reduced moisture absorption. At the same time, the mechanical properties and heat resistance should be retained to a very large extent.

We have found that this object is achieved by means of the molding compositions defined at the outset. Preferred embodiments are given in the subclaims.

Surprisingly, the combination of a partly crystalline polyamide with a copolyamide which is built up essentially from ε-caprolactam units gives significantly lower shrinkage and deformation after processing.

The novel thermoplastic molding compositions contain, as component A), from 10 to 97.9% by weight, preferably from 30 to 89.5% by weight and in particular from 30 to 84% by weight, of a partly crystalline thermoplastic polyamide.

The viscosity number of the polyamides of the novel molding compositions, determined in a 0.5% strength by weight solution in 96% strength by weight sulfuric acid at 25° C., in accordance with ISO 307, is generally from 80 to 350 ml/g, preferably from 110 to 240 ml/g.

Preference is given to partly crystalline resins with a molecular weight (weight average) of at least 5000, as described, for example, in U.S. Pat. Nos. 2,071,250, 2,071,251, 2,130,523, 2,130,948, 2,241,322, 2,312,966, 2,512,606 and 3,393,210.

Examples of these are polyamides derived from lactams having from 7 to 13 ring members, such as polycaprolactam, polycaprylolactam and polylaurolactam, and also polyamides obtained by reacting diocarboxylic acids with diamines.

Dicarboxylic acids which may be used are alkanedicarboxylic acids having from 4 to 12 carbon atoms, in particular from 6 to 10 carbon atoms, and aromatic dicarboxylic acids. Mention may be made here merely of adipic acid, azeleic acid, sebacic acid, dodecanedioic acid and terephthalic and/or isophthalic acid.

Particularly suitable diamines are alkanediamines having from 4 to 12 carbon atoms, in particular from 4 to 8 carbon atoms, such as hexamethylenediamine, 1,4-diaminobutane, di(4-aminophenyl)methane, di(4-aminocyclohexyl)methane, 2,2-di(4-aminophenyl)propane or 2,2-di(4-aminocyclohexyl)propane.

Preferred polyamides are polyhexamethyleneadipamide (nylon-6,6), polyhexamethylenesebacamide (nylon-6,10) and polycaprolactam (nylon-6), and also nylon-12, nylon-6,9 and nylon-11.

In addition, mention may be made of polyamides which are obtainable, for example, by condensing 1,4-diaminobutane with adipic acid at elevated temperature (nylon-4,6). Preparation processes for polyamides of this structure are described, for example, in EP-A 38 094, EP-A 38 582 and EP-A 39 524.

Other suitable polyamides are those obtained by copolymerizing two or more of the monomers mentioned above, or mixtures of more than one polyamide, the mixing ratio being as desired. The above copolymers are different from component B).

This includes in particular such partially aromatic copolyamides as nylon-6/6,T and nylon-6,6/6,T, the triamine content of which is less than 0.5% by weight, preferably less than 0.3% by weight (see EP-A 299 444).

The preferred partially aromatic copolyamides with low triamine content may be prepared by the processes described in EP-A 129 195 and 129 196.

The novel molding compositions contain, as component B), from 0.1 to 50% by weight, preferably from 0.5 to 40% by weight and in particular from 1 to 25% by weight, of a copolyamide differing from A) and composed of B$_1$) from 60 to 90 mol %, preferably from 65 to 85 mol % and in particular from 70 to 85 mol %, of units derived from ε-caprolactam and B$_2$) from 10 to 40 mol %, preferably from 15 to 35 mol % and in particular from 15 to 30 mol %, of units derived from aliphatic dicarboxylic acids and from aliphatic diamines, Preferred dicarboxylic acids are alkanedicarboxylic acids having from 6 to 12 carbon atoms, in particular from 6 to 10 carbon atoms, adipic acid being particularly preferred.

Suitable diamines are alkanediamines having from 6 to 12 carbon atoms, in particular from 6 to 8 carbon atoms, hexamethylene-diamine being particularly preferred.

The viscosity number of the copolyamides, among which preference is given to nylon-6/6,6, is generally from 100 to 350 ml/g, preferably from 120 to 330 ml/g, determined in a 0.5% strength by weight solution in 96% strength by weight sulfuric acid at 25° C. in accordance with ISO 307. Processes for preparing copolyamides of this type are known to the person skilled in the art, and further details on this topic are therefore unncessary.

The novel molding compositions contain, as component C), from 1 to 40% by weight, based on the total of components A to E, of at least one copolymer based on styrene or on substituted styrenes and on unsaturated nitriles. Component C is present in preferred novel molding compositions in proportions of from 5 to 35% by weight, in particular from 5 to 15% by weight, based on the total of components A to E.

According to the invention, the copolymers C are built up from c$_1$) from 60 to 95% by weight, preferably from 63 to 85% by weight, of styrene or of substituted styrenes of the formula I or mixtures of these

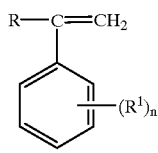

I where R is $C_1$–$C_8$-alkyl, preferably methyl or ethyl, or hydrogen, and R$^1$ is $C_1$–$C_8$-alkyl, preferably methyl or ethyl, and n is 1, 2 or 3, or mixtures of these, and c$_2$) from 5 to 40% by weight, preferably from 15 to 37% by weight, of at least one unsaturated nitrile, preferably acrylonitrile or methacrylonitrile or mixtures of these, and also c$_3$) from 0 to 35% by weight, preferably from 0 to 22% by weight, of other copolymerizable monomers.

The copolymers C are resin-like, thermoplastic and rubber-free. Particularly preferred copolymers C are those made from styrene and acrylonitrile, made from α-methylstyrene and acrylonitrile or made from styrene, α-methylstyrene and acrylonitrile. It is also possible to use simultaneously more than one of the copolymers described.

Possible components C$_3$) are acrylic acid, methacrylic acid and/or esters thereof, vinylphenol, maleic anhydride, glycidyl (meth)acrylate, hydroxyethyl acrylate, vinylimidazole, vinylpyrrolidone, dimethylaminoethyl acrylate, isopropenyl-oxazoline, N-phenylmaleimide, N-methylmaleimide or N-cyclohexylmaleimide, or mixtures of these.

The copolymers C are known per se and may be prepared by free-radical polymerization, in particular by emulsion, suspension, solution or bulk polymerization. They have viscosity numbers in the range from 40 to 160, and this corresponds to average molecular weights $M_w$ (weight average) of from 40,000 to 2,000,000.

The novel molding compositions contain, as component D), from 1 to 50% by weight, preferably from 5 to 45% by weight and in particular from 10 to 35% by weight, of a particulate or fibrous filler or mixtures of these.

Preferred fibrous fillers are carbon fibers, aramid fibers and potassium titanate fibers, and particular preference is given to glass fibers in the form of E glass. These may be used as rovings or as chopped glass in the forms commercially available.

The fibrous fillers may be pretreated on their surfaces with a silane compound to improve compatibility with the thermoplastic.

Suitable silane compounds are those of the formula II

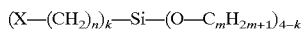

II where the substituents are:

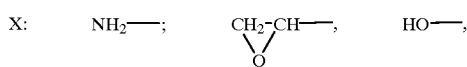

n: an integer from 2 to 10, preferably 3 or 4
m: an integer from 1 to 5, preferably 1 or 2
k: an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which contain a glycidyl group as substituent X.

The silane compounds are generally used for surface coating in amounts of from 0.05 to 5% by weight, preferably from 0.5 to 1.5% by weight and in particular from 0.8 to 1% by weight (based on D).

Acicular and particulate fillers are also suitable.

For the purposes of the invention, acicular mineral fillers are mineral fillers with strongly developed acicular character, for example acicular wollastonite. The mineral preferably has an L/D (length to diameter) ratio of from 8:1 to 35:1, more preferably from 8:1 to 11:1. The mineral filler may, if desired, be pretreated with the silane compounds mentioned above; however, the pretreatment is not absolutely essential.

Other particulate fillers which may be mentioned are kaolin, mica, talc, wollastonite, montmorillonite, calcined kaolin and chalk.

The novel molding compositions may contain, as component E), up to 30% by weight, preferably up to 20% by weight, of other additives. An example which may be mentioned is fluorine-containing ethylene polymers in amounts of from 0 to 2% by weight. These are ethylene polymers with a fluorine content of from 55 to 76% by weight, preferably from 70 to 76% by weight.

Examples of these are polytetrafluoroethylene (PTFE), tetrafluoroethylene copolymers, and tetrafluoroethylene copolymers with relatively small proportions (generally up to 50% by weight) of copolymerizable ethylenically unsaturated monomers. These are described, for example, by Schildknecht in "Vinyl and Related Polymers", Wiley, 1952, pages 484–494, and by Wall in "Fluoropolymers" (Wiley Interscience, 1972).

These fluorine-containing ethylene polymers are homogeneously distributed in the molding compositions, and preferably have a particle size $d_{50}$ (number average) in the range from 0.05 to 10 µm, in particular from 0.1 to 5 µm. These small particle sizes may be achieved particularly preferably by using aqueous dispersions of fluorine-containing ethylene polymers and incorporating these, for example, into a polyamide melt.

Additives which may be mentioned are impact modifiers (also termed elastomeric polymers or elastomers), which may be present in amounts of up to 20% by weight, preferably up to 15% by weight.

The usual rubbers are suitable, e.g. ethylene copolymers having reactive groups, acrylate rubber and polymers of conjugated dienes, such as polybutadiene rubber and polyisoprene rubber. The diene polymers may be partially or completely hydrogenated in a known manner. Examples of other possible polymers are: hydrogenated styrene-butadiene rubber, ethylene-propylene-diene rubber, polybutylene rubbers, polyoctenamer rubbers, ionomers, block copolymers made from vinylaromatic monomers with dienes, such as butadiene or isoprene (known per se from EP-A 62 282) having the structure $M^1M^2$-, $M^1M^2M^1M^2$- or $M^1M^2M^1$-, where these block polymers may also contain segments having random distribution, and also star-block copolymers. Polymers of conjugated dienes, such as polybutadiene rubber or polyisoprene rubber, have proven particularly suitable. Synthetic rubbers of this type are familiar to the person skilled in the art and are reviewed in Ullmanns Encyklopädie der Technischen Chemie, 4th edition, Vol. 13, pages 595–634, Verlag Chemie GmbH, Weinheim 1977.

Particular preference is given to graft rubbers such as ABS polymers or ASA polymers. ABS or ASA polymers are very generally mixtures of graft polymers having a soft graft base whose glass transition temperature ($T_g$) is generally below 10° C. and, grafted onto this, a shell made from monomers whose polymers have glass transition temperatures of generally above 25° C. In addition, ABS polymers and ASA polymers generally also contain, as hard component, copolymers made from the monomers which form the graft shell of the graft copolymer.

ABS polymers and ASA polymers differ essentially in the chemical mix of the graft base: ASA polymers use acrylate rubbers, and ABS polymers use diene rubbers, in particular those based on butadiene.

Some preferred ASA polymers are described in somewhat greater detail below; these comments also apply to ABS polymers if, instead of acrylates, the components used for the graft base are butadiene or mixtures of butadiene with styrene, with acrylonitrile or with smaller proportions of other copolymerizable monomers. In the case of butadiene polymers, the concomitant use of the crosslinking monomers $p_{12}$ is not absolutely essential, since under suitable conditions butadiene itself has a crosslinking effect.

Preferred ASA polymers P comprise a graft copolymer built up from $p_1$) from 50 to 90% by weight of a graft base based on
$p_{11}$) from 95 to 99.9% by weight of a $C_2$–$C_{10}$-alkyl acrylate and
$p_{12}$) from 0.1 to 5% by weight of a polyfunctional, preferably bifunctional, monomer having at least two non-conjugated olefinic double bonds, and $p_2$) from 10 to 50% by weight of a graft made from
$p_{21}$) from 50 to 90% by weight of styrene or of substituted styrenes of the formula I or mixtures of these

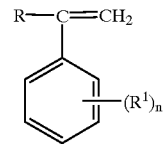

and
$p_{22}$) from 10 to 50% by weight of acrylonitrile or methacrylonitrile or mixtures of these.

Component $p_1$) is an elastomer which has a glass transition temperature of below –20° C., in particular below –30° C.

The monomers used as main monomers $p_{11}$) for preparing the elastomer are acrylates having from 2 to 10 carbon atoms, in particular from 4 to 8 carbon atoms. Mention may be made here of the particularly preferred monomers tert-butyl, isobutyl and n-butyl acrylate, and also 2-ethylhexyl acrylate, of which the two last named are particularly preferred.

Besides these acrylates, use is made of from 0.1 to 5% by weight, in particular from 1 to 4% by weight, based on the total weight $p_{11}+p_{12}$, of a polyfunctional monomer having at least two non-conjugated olefinic double bonds. Among these, preference is given to bifunctional compounds, i.e. those having two non-conjugated double bonds. Examples which may be mentioned here are divinylbenzene, diallyl fumarate, diallyl phthalate, triallyl cyanurate, triallyl isocyanurate, tricyclodecenyl acrylate and dihydrodicyclopentadienyl acrylate, of which the two last named are particularly preferred.

Processes for preparing the graft base $p_1$) are known per se and are described, for example, in DE-B-12 60 135. Corresponding products are also available commercially.

Preparation by emulsion polymerization has proven particularly advantageous in some cases.

The proportion of the graft base $p_1$) in the graft polymer P is generally from 50 to 90% by weight, preferably from 55 to 85% by weight and in particular from 60 to 80% by weight, based on the total weight of P.

A graft shell $p_2$) is grafted onto the graft base $p_1$), and is obtainable by copolymerizing
$p_{21}$) from 50 to 90% by weight, preferably from 60 to 90% by weight and in particular from 65 to 80% by weight, of styrene or of substituted styrenes of the formula I

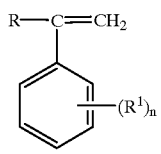

I where R is alkyl having from 1 to 8 carbon atoms, or is hydrogen or halogen, and $R^1$ is alkyl having from 1 to 8 carbon atoms, or is halogen, and n is 0, 1, 2 or 3, and $p_{22}$) from 10 to 50% by weight, preferably from 10 to 40% by weight and in particular from 20 to 35% by weight, of acrylonitrile or methacrylonitrile or mixtures of these.

The graft shell $p_2$ may be prepared in one step or in more than one step, e.g. two or three steps, the overall mix remaining unaffected thereby.

The graft shell is preferably prepared in emulsion, as described, for example, in DE-C 12 60 135, DE-A 32 27 555, DE-A 31 49 357 and DE-A 34 14 118.

Depending on the conditions selected, the graft copolymerization gives a certain proportion of free copolymers of styrene and acrylonitrile.

The free, non-grafted homo- and copolymers produced during the graft copolymerization to prepare component $p_2$) generally also count as part of the graft polymer P, and their proportion in component P depends on the conditions during preparation of the graft.

Some preferred graft polymers are set out below:

1. 65% by weight of graft base $p_1$) made from
   $p_{11}$) 98% by weight of n-butyl acrylate and
   $p_{12}$) 2% by weight of dihydrodicyclopentadienyl acrylate and
   35% by weight of graft shell $p_2$) made from
   $p_{21}$) 70% by weight of styrene and
   $p_{22}$) 30% by weight of acrylonitrile
2. A graft base as in 1. with 5% by weight of a 1st graft shell made from
   styrene (1st graft) and
   35% by weight of a second graft made from
   $p_{21}$) 70% by weight of sytrene and
   $p_{22}$) 30% of acrylonitrile
3. A graft base as in 1. with 13% by weight of a 1st graft made from styrene and 27% by weight of a second graft made from styrene and acrylonitrile in a weight ratio of 3:1

As component P', the preferred ASA polymers may contain a copolymer made from $p'_1$) from 50 to 90% by weight, preferably from 55 to 90% by weight and in particular from 65 to 85% by weight, of styrene and/or of substituted styrenes of the formula I and $p'_2$) from 10 to 50% by weight, preferably from 10 to 45% by weight and in particular from 15 to 35% by weight, of acrylonitrile and/or methacrylonitrile.

Products of this type may, for example, be prepared by the process described in DE-B 10 01 001 and DE-B 10 03 436. Copolymers of this type are also available commercially. The weight-average molecular weight, determined by light scattering, is preferably in the range from 50,000 to 500,000, in particular from 100,000 to 250,000.

The weight ratio of graft copolymer P to copolymer P' in the ABS polymers and ASA polymers is generally in the range from 20:80 to 80:20, preferably from 30:70 to 70:30.

ASA polymers are obtainable under the designation Luran® S, and ABS polymers under the designation Terluran®, in each case from BASF Aktiengesellschaft.

Other additives which may be mentioned are heat stabilizers and light stabilizers, lubricants, mold-release agents and colorants, such as dyes and pigments in usual amounts.

Additional pigments and dyes are generally present in amounts of up to 2% by weight, preferably up to 1% by weight and in particular up to 0.5% by weight. Pigments of this type give a deepening of color or different degrees of mattness of black colors, and are well known, for example from R. Gächter and H. Müller, Taschenbuch der Kunststoffadditive, Carl Hanser Verlag, 1983, pp. 494–510. A first preferred group of pigments which should be mentioned is that of white pigments, such as zinc oxide, zinc sulfide, white lead ($2PbCO_3.Pb(OH)_2$), lithopones, antimony white and titanium dioxide. Of the two most common crystal forms of titanium dioxide (rutile and anatase), the rutile form in particular is used for adjusting the appearance of the novel molding compositions.

Black pigments which may be used according to the invention are iron oxide black ($Fe_3O_4$), spinel black (Cu, $(Cr,Fe)_2O_4$), manganese black (a mixture of manganese dioxide, silica and iron oxide), cobalt black and antimony black, and also particularly preferably carbon black, mostly in the form of furnace or gas black (see in this connection G. Benzing, Pigmente für Anstrichmittel, Expert-Verlag (1988), pp. 78ff). An example of an organic black dye is nigrosin.

Oxidation inhibitors and heat stabilizers which may be added to the thermoplastic compositions according to the invention are, for example, halides of metals of group I of the Periodic Table, e.g. halides of sodium, potassium and lithium, if desired in combination with copper(I) halides, e.g. chlorides, bromides or iodides. It is moreover possible to use zinc fluoride and zinc chloride. Compounds which may also be used are sterically hindered phenols, hydroquinones, substituted representatives of this class, secondary aromatic amines, if desired combined with phosphorus-containing acids and/or salts of these, HALS (hindered amine light stabilizers), and mixtures of these compounds, preferably in concentrations of up to 1% by weight, based on the weight of the mixture.

Examples of UV stabilizers are various substituted resorcinols, salicylates, benzotriazoles and benzophenones, generally used in amounts of up to 2% by weight.

Examples of antistats for SAN are the diethanolamine derivative of coconut oil, and sodium alkylsulfonates.

Lubricants and mold-release agents, which are generally added to the thermoplastic molding composition in amounts of up to 1% by weight, are stearic acid, stearyl alcohol, octadecyl alcohol, alkyl stearates, stearamides, ethylenebisstearylamide, and also esters of pentaerythritol with long-chain fatty acids. It is also possible to use stearates of calcium, zinc or aluminum, and also dialkyl ketones, e.g. distearyl ketone.

Examples of flame retardants are red phosphorus, phosphorus compounds, melamine cyanurate, alkaline-earth carbonates, magnesium hydroxide and halogenated flame retardants, such as decabromodiphenylethane, and these may be used in amounts of up to 20% by weight, preferably up to 15% by weight.

The additives also include stabilizers which prevent the decomposition of the red phosphorus in the presence of moisture and atmospheric oxygen. Examples which may be mentioned are compounds of cadmium, zinc, aluminum, tin, magnesium, manganese and of titanium. Examples of particularly suitable compounds are oxides of the metals mentioned, also carbonates and oxicarbonates, hydroxides, and also salts of organic or of inorganic acids, for example acetates or phosphates or hydrogenphosphates.

Low-molecular-weight polymers are also possible additives, particular preference being given to polyethylene wax as a lubricant.

The properties of the final products may be controlled as desired to a large extent via the type and amount of these additives.

The novel molding compositions may be prepared by processes known per se. In a preferred embodiment, preparation is carried out by adding components D) and E) to a melt of components A), B) and C).

It is expedient to use extruders for this purpose, e.g. single-screw or twin-screw extruders, or other conventional plasticating equipment, such as Brabender mixers or Banbury mixers.

The polyamide mixtures may subsequently be subjected to another thermal treatment, i.e. a postcondensation in the solid phase. The molding composition, in the form appropriate to the process, is conditioned in a conditioning apparatus, for example a tumbling mixer or a continuous or batch conditioning tube, until the desired viscosity number VN or relative viscosity ηrel, for example of the polyamide, is reached. The temperature range for the conditioning depends on the melting point of the pure component A). Preferred temperature ranges are below the respective melting point of the pure component A) by from 5 to 50° C., preferably by from 20 bis 30° C. The process is preferably carried out in an inert gas atmosphere, preferred inert gases being nitrogen and superheated steam.

The residence times are generally from 0.5 to 50 hours, preferably from 4 to 20 hours. Moldings are then produced from the molding compositions using conventional apparatus.

The novel molding compositions have very low shrinkage and deformation after processing. The mechanical properties of the moldings are to a very large extent retained and their surface properties and moisture absorption are markedly improved and reduced, respectively.

The novel molding compositions are therefore suitable for producing fibers, films and moldings of any type. Preferred applications are in particular moldings which are produced and/or bonded by welding and/or two-component injection molding and/or screwing, or also by means of other known jointing techniques, such as adhesive bonding, riveting or flanging, and these are used in particular in the automotive industry, e.g. as door handles, exterior mirrors, suction pipes and transmission or gear casings.

EXAMPLES

Component A

A1: Poly-ε-caprolactam (nylon-6) with a viscosity number (VN), determined in accordance with ISO 307 as 0.5% strength by weight solution in 96% strength by weight sulfuric acid at 25° C., of 150 ml/g (Ultramid® B3 from BASF AG).

A2: Polyhexamethylene adipamide (nylon-6,6) with a VN in accordance with ISO 307 of 150 ml/g (Ultramid® A3 from BASF AG).

Component B1

A copolyamide composed of 80 mol % of units derived from ε-caprolactam, and 20 mol % of units derived from hexamethylenediamine/adipic acid, having a viscosity number in accordance with ISO 307 of 195 ml/g.

Component B1comp

A copolyamide composed of 55 mol % of units derived from ε-caprolactam and 45 mol % of units derived from hexamethylenediamine/adipic acid, and having a viscosity number in accordance with ISO 307 of 190 ml/g.

Component B2comp

A copolyamide composed of 95 mol % of units derived from ε-caprolactam and 5 mol % of units derived from hexamethylenediamine/adipic acid, and having a viscosity number in accordance with ISO 307 of 192 ml/g.

Component C

A copolymer made from 75% by weight of styrene and 25% by weight of acrylonitrile, having a viscosity number (measured in a 0.5% strength by weight solution in dimethylformamide at 23° C.) of 80 ml/g.

Component D

Short glass fiber (fiber diameter 10 μm) of staple length 4.5 mm with aminosilane size.

Component E1

Black Pearls 880 carbon black from Cabot in the form of 30% strength by weight masterbatch in polyethylene.

Component E2

CuI dispersed in component A1, the copper content being 1.5% by weight.

Preparation and Testing of the Molding Compositions

The components were mixed in a twin-screw extruder at a melt temperature of 280° C. The melt was passed through a waterbath and granulated.

The molding took place at a melt temperature of 280° C. and a mold temperature of 60° C.

The heat resistance of the specimens was determined by means of their Vicat softening point. The Vicat softening point was determined on standard small specimens in accordance with DIN 53 460, with a force of 49.05 N and a temperature rise of 50 K per hour.

The moduli of elasticity and ultimate tensile strengths were determined in a tensile test on dumbbell specimens in accordance with ISO 527.

Shrinkage and deformation behavior was evaluated using sheets of dimensions 110×110×3 mm, shrinkage in length and width (near to the sprue, and away from the sprue) being determined.

The surface quality of the sheets was evaluated qualitatively (+: good, o: satisfactory, −: poor).

The mixes for the molding compositions, and the results of the tests, are given in Table 1.

TABLE 1

| Example No. | 1 comp | 2 comp | 3 | 4 comp | 5 comp | 6 comp | 7 comp | 8 | 9 comp |
|---|---|---|---|---|---|---|---|---|---|
| Mix component [% by weight] | | | | | | | | | |
| A1 | 67.6 | 54.6 | 36.6 | 36.6 | 36.6 | — | — | — | — |
| A2 | — | — | — | — | — | 67.6 | 54.6 | 36.6 | 36.6 |
| B1 | — | — | 18 | 31 | — | — | — | 18 | — |
| B1 comp | — | — | — | — | 18 | — | — | — | — |
| B2 comp | — | — | — | — | — | — | — | — | 18 |
| C | — | 13 | 13 | — | 13 | — | 13 | 13 | 13 |
| D | 30 | 30 | 30 | 30 | 30 | 30 | 30 | 30 | 30 |
| E1 | 1.7 | 1.7 | 1.7 | 1.7 | 1.7 | 1.7 | 1.7 | 1.7 | 1.7 |
| E2 | 0.7 | 0.7 | 0.7 | 0.7 | 0.7 | 0.7 | 0.7 | 0.7 | 0.7 |
| Vicat B [° C.] | 213 | 209 | 206 | 193 | 210 | >250 | 245 | 223 | 227 |
| Modulus of elasticity [N/mm$^2$] | 9500 | 10,200 | 10,150 | 9700 | 9800 | 9900 | 10,300 | 10,100 | 9900 |
| Ultimate tensile strength [N/mm$^2$] | 165 | 161 | 162 | 157 | 160 | 171 | 154 | 153 | 154 |
| Shrinkage | | | | | | | | | |
| Length [%] | 0.30 | 0.40 | 0.36 | 0.4 | 0.4 | 0.36 | 0.32 | 0.26 | 0.33 |
| Width | | | | | | | | | |
| Near to the sprue [%] | 0.83 | 0.68 | 0.62 | 0.74 | 0.71 | 1.20 | 0.90 | 0.75 | 0.86 |
| Away from the sprue [%] | 0.87 | 0.64 | 0.61 | 0.72 | 0.69 | 1.34 | 0.97 | 0.81 | 0.90 |
| Deformation [mm] | 0.6 | 0.4 | 0.3 | 0.5 | 0.4 | 0.6 | 0.3 | 0.1 | 0.4 |
| Surface | ○ | + | + | ○ | + | ○ | + | + | + | comp: comparative experiments

We claim:

1. A thermoplastic molding composition comprising
A) from 10 to 97.9% by weight of a partly crystalline polyamide different from B,
B) from 0.1 to 50% by weight of a copolyamide composed of
  $B_1$) from 60 to 90 mol % of units derived from ε-caprolactam and
  $B_2$) from 10 to 40 mol % of units derived from both aliphatic dicarboxylic acids and from aliphatic diamines,
C) from 1 to 40% by weight of a rubber-free copolymer of a styrene of the formula I or mixtures thereof

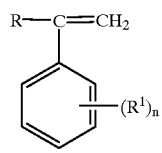

where R is alkyl having from 1 to 8 carbon atoms or hydrogen and $R^1$ is alkyl having from 1 to 8 carbon atoms, and n is 1, 2 or 3, and an unsaturated nitrile or mixtures of unsaturated nitriles,
D) from 1 to 50% by weight of a particulate or fibrous filler or mixtures of these.

2. The thermoplastic molding composition as claimed in claim 1, containing, as polyamide A), nylon-6, nylon-6,6, nylon-6/6,T, nylon-6,6/6,T, nylon-6,9 or nylon-12, or mixtures of these.

3. The thermoplastic molding composition as claimed in claim 1, in which the units $B_2$) are built up from hexamethylenediamine and adipic acid.

4. The thermoplastic molding composition as claimed in claim 1, in which component C) is built up from $C_1$) from 60 to 95% by weight of styrene or substituted styrenes of the formula I or mixtures of these

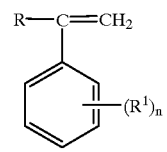

where R is alkyl having from 1 to 8 carbon atoms or hydrogen and $R^1$ is alkyl having from 1 to 8 carbon atoms, and n is 1, 2 or 3, and $C_2$) from 5 to 40% by weight of an unsaturated nitrile or mixtures of these, and also $C_3$) from 0 to 35% by weight of other copolymerizable monomers.

5. The thermoplastic molding composition as claimed in claim 4, in which the monomers $C_2$) are composed of acrylonitrile or methacrylonitrile or mixtures of these.

6. The thermoplastic molding composition as claimed in claim 1, in which component D) has been pretreated on its surface with silane compounds of the formula II

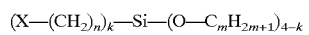

where the substituents are:
X: $NH_2-$; 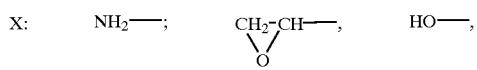 $HO-$,
n: an integer from 2 to 10,
m: an integer from 1 to 5, and
k: an integer from 1 to 3.
7. The molding composition as claimed in claim 6 wherein the substitutents are;
n: 3 or 4,
m: 1 or 2, and
K: 1.
8. A molding, fiber or film prepared from the molding composition of claim 1.
* * * * *